June 8, 1954 — D. J. BURKE — 2,680,271
CAST WELDING APPARATUS
Filed May 3, 1951 — 2 Sheets-Sheet 1
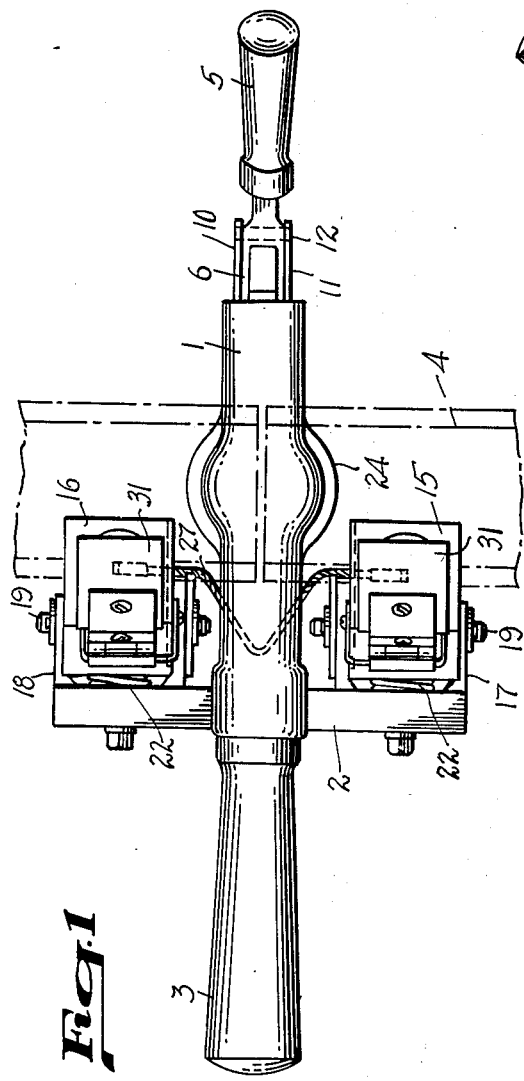
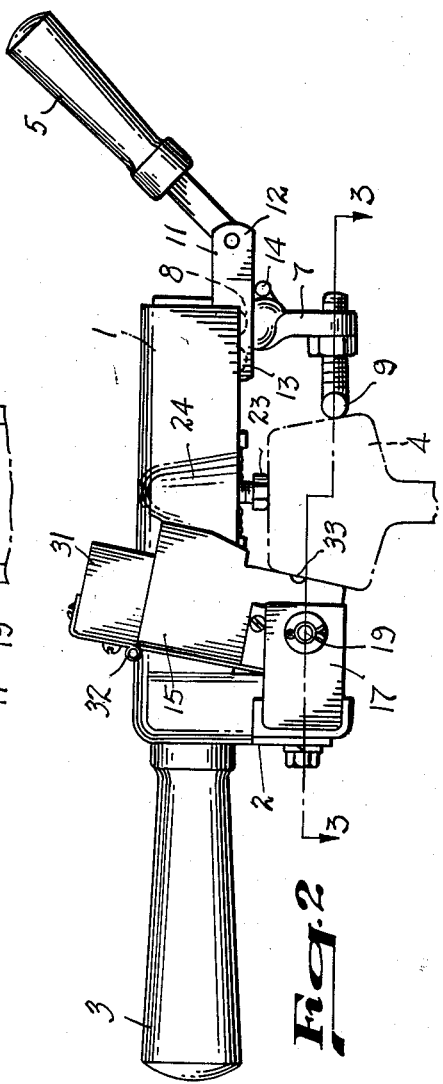
INVENTOR.
DONALD J. BURKE.
BY Oberlin & Limbach
ATTORNEYS June 8, 1954　　　D. J. BURKE　　　2,680,271
CAST WELDING APPARATUS
Filed May 3, 1951　　　2 Sheets-Sheet 2
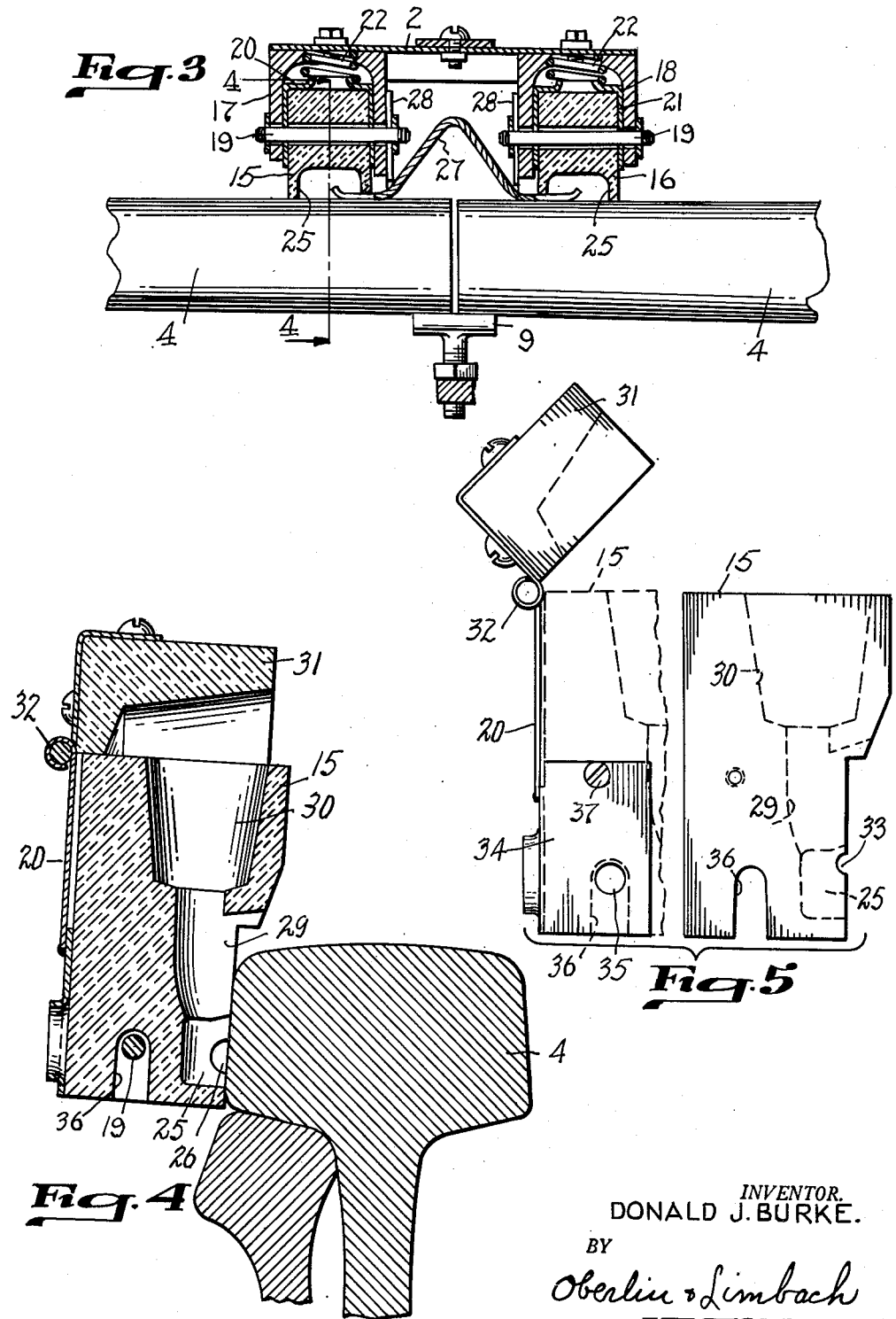
INVENTOR.
DONALD J. BURKE.
BY
Oberlin & Limbach
ATTORNEYS Patented June 8, 1954

2,680,271

UNITED STATES PATENT OFFICE 2,680,271

CAST WELDING APPARATUS

Donald J. Burke, Cleveland, Ohio, assignor to Erico Products, Inc., Cleveland, Ohio, a corporation of Ohio Application May 3, 1951, Serial No. 224,349

5 Claims. (Cl. 22—116)

This invention relates, as indicated, to cast welding apparatus, and more particularly to apparatus for attaching copper bonds to steel rails by a cast welding method wherein molten weld metal such as copper produced by an exothermic reaction is supplied to a mold cavity into which one end of the bond projects thus integrally to secure such bond end to the rail.

In Patent No. 2,229,045 of Charles A. Cadwell, there is disclosed a welding material adapted for use in an exothermic reaction comprising a mixture of copper oxide and a crushed copper aluminum alloy which, when ignited, will produce a charge of molten copper suitable for immediate use in the welding of a copper or copper alloy rail bond to a steel rail or the like. Patent No. 2,277,014 to Noble G. Carlson discloses a form of rail bonding apparatus particularly suited for use with the aforesaid welding material in the attachment of rail bonds to rails, such apparatus comprising two spaced mold blocks and common clamping means therefor adapted to clamp the same against the side of a rail head. Such welding material and apparatus have enjoyed great commercial success for the past several years.

Due to the fact that a relatively small charge of molten copper is ordinarily employed to form the bond terminal, particularly when attaching the usual small signal bonds, it is necessary that such charge be at a relatively high temperature when it enters the mold cavity. Difficulty has been encountered with various types of apparatus employed in the past in preserving the heat content of the charge prior to entering the mold cavity and as a consequence, defective bond terminals have on occasion resulted. Thus, if a small charge of weld metal is spread thin prior to entering the mold cavity, the heat content thereof is rapidly dissipated.

It is therefore a primary object of my invention to provide welding apparatus whereby the temperature of the molten charge of weld metal produced therein may be substantially preserved prior to entering the mold cavity and thus prevent the formation of defective bond terminals.

More specifically, an object of my invention is to provide novel rail bonding apparatus wherein the molten charge is supplied directly from the crucible in which it is produced to the mold cavity without being caused to dissipate its heat unnecessarily en route.

A further object is to provide a mold block assembly wherein the individual mold blocks may be simply and easily removed from their supporting frames to facilitate replacement without further disassembly of the apparatus.

Other objects and advantages of the present invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a top plan view of apparatus embodying my invention;

Fig. 2 is a side elevational view of such apparatus;

Fig. 3 is a sectional view taken along the line 3—3 on Fig. 2;

Fig. 4 is a sectional view of a mold block assembly shown in operative position against the side of a rail head, such view having been taken substantially along the line 4—4 on Fig. 3; and Fig. 5 is a view in side elevation of a mold block and supporting frame with such parts being shown disassembled.

As indicated, the apparatus of the present invention is designed primarily for cast welding bond terminals to rails and, since rail bonds are usually intended to have their respective ends attached to opposed rail ends, the apparatus illustrated in the drawings is provided with two mold blocks to receive the respective ends of the bond for more or less simultaneous welding of the same. However, it will be understood that the apparatus may readily be adapted for use in attaching bond ends singly.

Referring now to the drawings and more specifically to Figs. 1 and 2 thereof, the embodiment there illustrated comprises a main frame comprising a downwardly opening channel member 1 carrying a transverse channel frame member 2 therebeneath. A handle 3 extends from the end of main frame member 1 by which the apparatus is adapted to be lifted and placed upon a rail head 4.

A toggle clamping mechanism is mounted on the other end portion of channel member 1 and comprises a handle 5 terminating in a clevis 6 which is pivotally connected to a downwardly extending lever 7 at 8. Such lever 7 has a rail engaging shoe 9 threadedly joined thereto, whereby adjustment of the same is possible toward and away from the side of the rail head. Links 10 and 11 are pivotally mounted on either side of handle 5 at 12, such links also being pivotally connected at 13 within channel member 1 to a spring-backed rod (not shown) within channel 1 which affords the desired resilient toggle action. Thus, it will be seen that when handle 5 is moved upwardly, lever 7 is swung outwardly thereby moving shoe 9 away from the rail head. Likewise, movement of handle 5 downwardly causes shoe 9 to be moved into resilient clamping position. Stop 14 welded to lever 7 limits downward movement of clevis 6 and links 10 and 11. The precise construction of such clamping mechanism forms no part of the present invention and for further details reference may be had to the pending application of Edward B. Neff, Serial No. 92,067, filed May 7, 1949, now Patent No. 2,654,129, granted October 6, 1953.

Referring now more particularly to Fig. 3, it will be seen that a pair of mold blocks 15 and 16 ordinarily of graphite are carried in clevises 17 and 18 respectively, bolted to transverse frame member 2. Such mold blocks are mounted in their respective clevises by means of pins 19 having a relatively loose fit in such clevises so that the mold blocks are permitted not only pivotal but also a certain degree of in and out movement. They will be seen to be partially enclosed and supported by sheet-metal frames 20 and 21 and compression springs 22 are interposed between the backs of such frames 20 and 21 and their respective clevises to urge the blocks inwardly toward the rail head 4 and also resiliently to resist pivotal movement of the blocks. It will thus be seen that when the faces of the mold blocks are drawn against the side of the rail head through the action of the above-described toggle clamping means such mold blocks are adapted independently to accommodate themselves to the sloping side of the rail head and are also permitted slight individual adjustment to the rail head in a horizontal plane.

The vertical positioning of the mold blocks is determined by adjustable screws 23 mounted in an expanded portion 24 of channel member 1 (see Fig. 2).

As best illustrated in Figs. 4 and 5, the two mold block assemblies (which are mirror images of one another) include mold cavities 25 which are open to the faces of the mold blocks adapted to be drawn against the side of the rail head. Lateral passages 26 of semi-circular cross-section open toward one another from the respective mold cavities 25 and are adapted to receive the end portions of a stranded conductor or bond 27 which thus extend into the respective mold cavities. Such bond will ordinarily be of copper or copper alloy with the bond end portions positioned in the respective mold cavities in position to be welded to the rail heads. Those portions of the bond within passages 26 will be enclosed in copper sleeves and crimped to semi-circular cross-section so that they may be held in close contact with the sides of the rail head 4. A spring clamp 28 is mounted on the side of each of the adjacent arms of the two mold block supporting clevises 17 and 18 in position to grip bond 27 and thus preliminarily secure the ends thereof in the respective mold cavities prior to mounting the apparatus on the rail head. This considerably expedites preparation for the bonding operation.

Sprue passages 29 lead into such respective mold cavities from above and as best shown in Fig. 4 are substantially vertically disposed so as to provide an uninterrupted or direct drop from above into such mold cavities. The slight inclination of the back of the sprue passage is compensated for by the tilt of the mold block when held against the inclined side of the rail head. The molten weld metal will therefore be delivered in an undiverted stream into the mold cavity and against the bond end. Each mold block is further provided with a crucible 30 formed in the upper portion thereof and communicating at its lower end with such sprue passage.

Graphite cover members 31 opening toward the rail when resting upon the top of the mold block are hingedly secured to the respective mold block supporting frames at 32 to permit the same to be swung back as shown in Fig. 5 to facilitate access to the crucibles for cleaning. When in lowered position, such covers serve to direct any flame or spatter from the exothermic reaction by which the weld metal is produced in a direction away from the operator.

As may be seen in Figs. 2 and 5, the mold cavities 25 are provided in their upper regions with laterally outwardly extending passages 33 which serve as overflows for any slight excess weld metal in the mold cavities.

As best seen in Fig. 5 of the drawings, the mold block supporting frames or jackets generally indicated at 20 and 21 in Fig. 3, include side portions 34 which partially enclose the respective mold blocks and have aligned apertures 35 therein for supporting transversely extending pins 19. The bottom faces of the respective mold blocks are formed with upwardly extending transverse grooves or notches 36 open at both ends and which, when the mold blocks are assembled in their respective frames, embrace the pins 19. Screws 37 serve to secure the mold blocks in the frames. Thus, it will be seen that by the mere removal of screws 37, the mold blocks may be simply and easily removed from their respective frames for cleaning or replacement.

When the metal-producing exothermic reaction material such as that disclosed in Cadwell Patent No. 2,229,045 is placed in crucibles 30, after first closing sprue passages 29 with a thin fusible metal disc, and ignited, the molten weld metal produced melts through such discs and descends directly into the mold cavities where it surrounds the bond ends therein and forms a thoroughly homogeneous weld terminal. The covers 31 will now be lifted and the crucibles cleaned of any slag or the like, allowing the cast terminals to anneal during this interval. The apparatus is then readily removed from the rail head after unclamping, leaving the bond integrally secured to the side of the rail head. Since the sprues 29 are open to the side of the rail head a considerable degree of vertical adjustment of the mold blocks is permitted and a bond may be attached near the lower edge of the rail head. Venting of gases is likewise facilitated as well as later cleaning of the sprue passage.

It will be seen that I have provided novel cast welding apparatus including mold blocks so formed that the weld metal produced in the crucible of each mold block is permitted to pass by means of an uninterrupted direct vertical drop through the sprue into the mold cavity. Having provided a sprue passage which is substantially vertically disposed and having no obstructions such as shelves or ledges throughout its extent, the weld metal upon melting through the fusible disc may descend directly into the mold cavity, thus preserving heat content of a small charge of molten metal which otherwise would tend to be dissipated if the metal were spattered or spread into a thin sheet by such obstructions prior to entering the mold cavity. Furthermore, the individual mold blocks may be easily removed from their respective supporting frames simply by the removal of a single screw 37 for cleaning or replacement when desired.

Certain subject-matter disclosed but not claimed herein is disclosed and claimed in my copending application Serial No. 399,747, filed December 22, 1953, "Welding Apparatus."

Other modes of applying the principle of the invention may be employed, change being made as regards the details described, provided the features stated in any of the following claims or the equivalent of such be employed.

I therefore particularly point out and distinctly claim as my invention:

1. In rail bonding apparatus comprising a mold block having a mold cavity in its rail-engaging face adapted to receive the end of a rail bond for cast-welding to such rail, and a mold supporting frame adapted to be mounted on such rail to support said mold block in proper position thereagainst; a transverse groove in said block opening along its entire length to the underside of said block, and a transverse member on said frame inserted in said groove whereby said block may be vertically removably supported thereon, said groove being parallel to said rail-engaging face of said mold block.

2. In rail bonding apparatus comprising a mold block having a mold cavity in its rail-engaging face adapted to receive the end of a rail bond for cast-welding to such rail, and a mold supporting frame adapted to be mounted on such rail to support said mold block in proper position thereagainst; a transverse groove in the underside of said block, a close-fitting sheet metal jacket enclosing a portion of said block including the ends of said groove, means removably securing said block in said jacket, and a pin mounted in said frame and extending through holes in said jacket aligned with the respective ends of said groove, whereby said block may pivotally accommodate itself to the slope of the face of the rail head to which it may be presented.

3. In rail bonding apparatus comprising a mold block having a mold cavity in its rail-engaging face adapted to receive the end of a rail bond for cast-welding to such rail, and a mold supporting frame adapted to be mounted on such rail to support said mold block in proper position thereagainst; a transverse groove in the underside of said block extending parallel to the rail-engaging face of the latter, a close-fitting sheet metal jacket enclosing the lower back and side portions of said block including the ends of said groove, means removably securing said block in said jacket, a pin mounted in said frame and extending through holes in said jacket aligned with the respective ends of said groove, said pin being mounted in said frame for limited movement toward and away from the face of such rail, and resilient means interposed between the back of said jacket and said frame adapted to urge said block toward such rail to the extent permitted by such mounting of said pin in said frame, whereby said block will be held resiliently in proper position against the face of such rail and may quickly be removed and replaced in the supporting frame without disassembly of the latter.

4. In rail bonding apparatus comprising a mold block having a mold cavity in its rail-engaging face adapted to receive the end of a rail bond for cast-welding to such rail, and a mold supporting frame adapted to be mounted on such rail to support said mold block in proper position thereagainst; a transverse groove in the underside of said block extending parallel to the rail-engaging face of the latter, a close-fitting sheet metal jacket enclosing the lower back and side portions of said block including the ends of said groove, means removably securing said block in said jacket, a pin mounted in said frame and extending through holes in said jacket aligned with the respective ends of said groove, said pin being mounted in said frame for limited movement toward and away from the face of such rail, resilient means interposed between the back of said jacket and said frame adapted to urge said block toward such rail to the extent permitted by such mounting of said pin in said frame, a crucible hollowed in the upper portion of said block and having a sprue leading to said mold cavity, a cover for said crucible, and hinge means connecting said cover to said jacket so that said block containing said mold cavity and crucible may be removed and replaced without disassembly of said frame or detaching said cover.

5. In rail bonding apparatus comprising a mold block having a mold cavity in its rail-engaging face adapted to receive the end of a rail bond for cast-welding to such rail, and a mold supporting frame adapted to be mounted on such rail to support said mold block in proper position thereagainst; a transverse groove in the underside of said block extending parallel to the rail-engaging face of the latter, a close-fitting sheet metal jacket enclosing the lower back and side portions of said block including the ends of said groove, means removably securing said block in said jacket, a pin mounted in said frame and extending through holes in said jacket aligned with the respective ends of said groove, said pin being mounted in said frame for limited movement toward and away from the face of such rail, resilient means interposed between the back of said jacket and said frame adapted to urge said block toward such rail to the extent permitted by such mounting of said pin in said frame, and a crucible hollowed in the upper portion of said block and having a sprue leading to such mold cavity, said sprue being open to the side of the rail from such mold cavity to a point above the top of the rail and adapted to afford an unobstructed vertical drop for the molten weld metal from said crucible to such mold cavity when in position against such rail.

References Cited in the file of this patent

UNITED STATES PATENTS

| Number | Name | Date |
|---|---|---|
| 1,382,294 | Kukac | June 21, 1921 |
| 1,757,148 | Spilsbury | May 6, 1930 |
| 1,892,376 | Begtrup | Dec. 27, 1932 |
| 1,947,966 | Begtrup | Feb. 20, 1934 |
| 2,030,053 | Channel | Feb. 11, 1936 |
| 2,238,926 | Cadwell | Apr. 22, 1941 |
| 2,262,755 | Cadwell | Nov. 18, 1941 |
| 2,401,048 | Cadwell | May 28, 1946 |